United States Patent

Tsuboi

(10) Patent No.: US 7,899,992 B2
(45) Date of Patent: Mar. 1, 2011

(54) CACHE CIRCUIT AND CONTROL CIRCUITS OF A CACHE MEMORY

(75) Inventor: Nobuhiro Tsuboi, Osaka (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 11/329,027

(22) Filed: Jan. 11, 2006

(65) Prior Publication Data

US 2006/0190686 A1 Aug. 24, 2006

(30) Foreign Application Priority Data

Feb. 21, 2005 (JP) .................................. 2005-043391
Oct. 19, 2005 (JP) .................................. 2005-303934

(51) Int. Cl.
*G06F 12/00* (2006.01)
(52) U.S. Cl. ... 711/125; 711/123; 711/143; 711/E12.022
(58) Field of Classification Search .................. 711/125, 711/143, 123
See application file for complete search history.

(56) References Cited

U.S. PATENT DOCUMENTS

| | | | | |
|---|---|---|---|---|
| 5,008,813 A | * | 4/1991 | Crane et al. | 711/119 |
| 5,140,681 A | * | 8/1992 | Uchiyama et al. | 711/134 |
| 5,499,354 A | * | 3/1996 | Aschoff et al. | 711/129 |
| 5,537,609 A | * | 7/1996 | Whittaker et al. | 711/119 |
| 5,640,531 A | * | 6/1997 | Whittaker et al. | 711/118 |
| 5,724,548 A | * | 3/1998 | Takahashi et al. | 711/138 |
| 5,796,980 A | * | 8/1998 | Bowles | 711/144 |
| 6,081,871 A | | 6/2000 | Hwangbo | |
| 6,981,112 B2 | * | 12/2005 | Christofferson et al. | 711/156 |
| 2003/0014597 A1 | * | 1/2003 | van de Waerdt | 711/136 |

FOREIGN PATENT DOCUMENTS

| | | |
|---|---|---|
| JP | 60-101655 | 6/1985 |
| JP | 60-196860 | 10/1985 |
| JP | 02-259845 | 10/1990 |
| JP | 02-300950 | 12/1990 |
| JP | 04-282735 | 10/1992 |
| JP | 05-035594 | 2/1993 |
| JP | 05-165675 | 7/1993 |
| JP | 05-189307 | 7/1993 |
| JP | 05-233450 | 9/1993 |

OTHER PUBLICATIONS

Hashimoto, Akihiro. "Joho Kogaku Nyumon Sensho (Selection of Introductions to Information Engineering) 7, Computer Architecture." Jul. 20, 1995, pp. 108-111 (Partial English Translation 2 Pages Only).
Japanese Office Action, with English Translation, issued in Japanese Patent Application No. JP 2005-303934, mailed on Jun. 24, 2008.

* cited by examiner

*Primary Examiner* — Mardochee Chery
(74) *Attorney, Agent, or Firm* — McDermott Will & Emery LLP

(57) ABSTRACT

In the cache circuit, an instruction cache hit counter counts the number of cache hits, and an instruction memory access counter counts the number of times of instruction access. An instruction cache hit rate computation/entry disabling control circuit computes the ratio of the cache hit count to the instruction access count (cache hit rate). If the cache hit rate exceeds an instruction cache entry disabling threshold, an instruction cache control circuit disables contents of instruction cache memory.

11 Claims, 5 Drawing Sheets

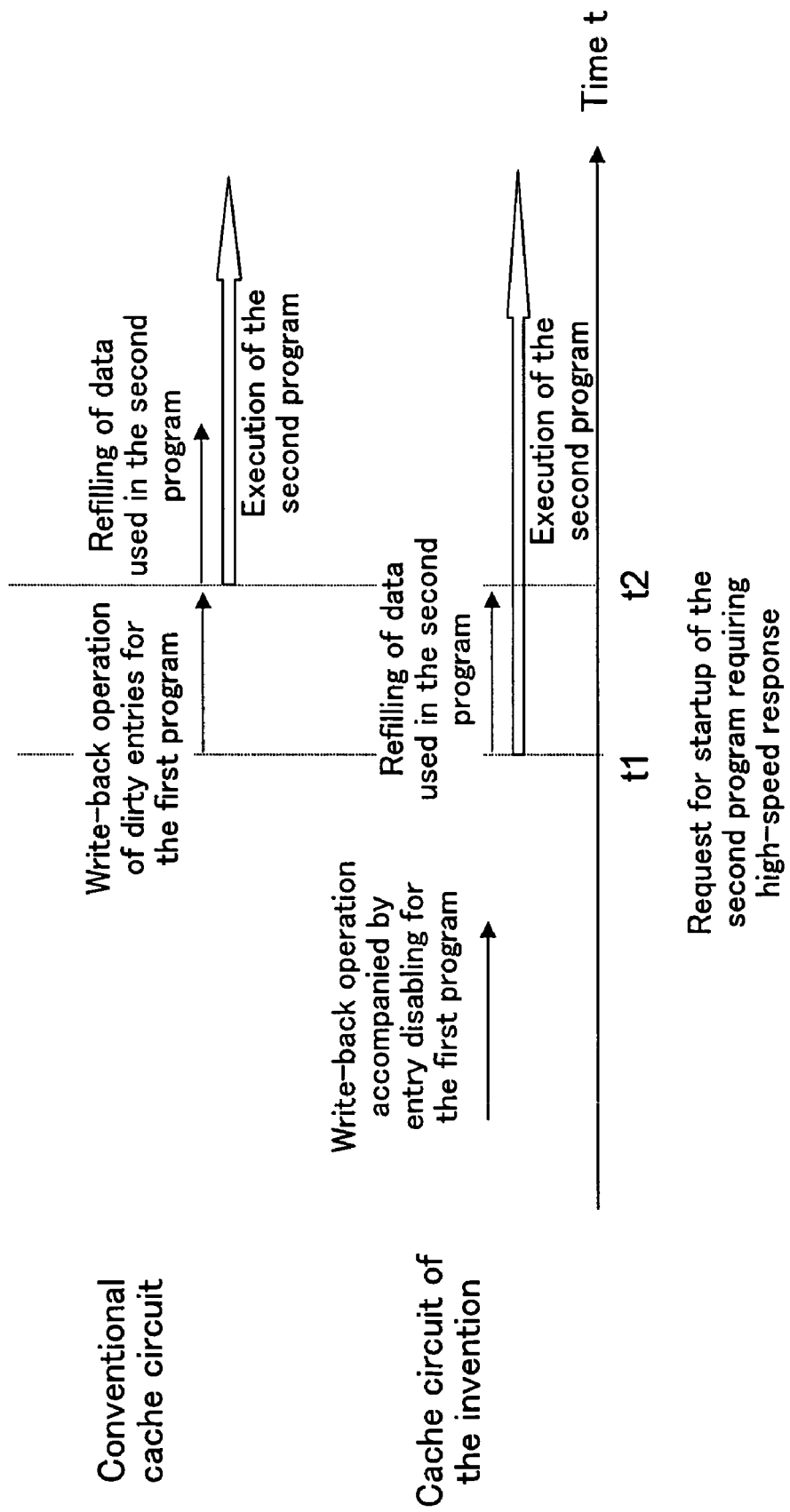

CACHE CIRCUIT AND CONTROL CIRCUITS OF A CACHE MEMORY

CROSS-REFERENCE TO RELATED APPLICATIONS

This application claims priority under 35 U.S.C. §119(a) on Patent Application No. 2005-043391 filed in Japan on Feb. 21, 2005, the entire contents of which are hereby incorporated by reference. The entire contents of Patent Application No. 2005-303934 filed in Japan on Oct. 19, 2005 are also incorporated by reference.

BACKGROUND OF THE INVENTION

The present invention relates to a cache circuit for controlling cache memory.

In general, in a computer system, cache memory, which is smaller in memory capacity but faster in processing speed than main memory, is provided between a central processing unit (CPU) and the main memory slow in processing speed compared with the CPU.

The cache memory temporarily holds a copy of an instruction code or data in the main memory to increase the apparent processing speed of the main memory as is observed from the CPU (see Akihiro Hashimoto "Joho Kogaku Nyumon Sensho (Selection of Introductions to Information Engineering) 7, Computer Architecture", Shokodo, Jul. 20, 1995).

A bus is provided between the CPU and the main memory for transfer of instruction codes and data stored in the main memory. In a computer system, the operation of the bus is examined and evaluated in some cases. In such examination and evaluation of the operation of the bus, a program is executed to allow the CPU to perform instruction accessing and data accessing to the main memory repeatedly under various conditions. Such a program generally has a loop structure in many cases to allow for the CPU's repeated access to the main memory.

In the case that a loop-structured program is executed in a computer system having cache memory, if all of instruction codes in the loop are held in cache memory for instruction codes (instruction cache memory), no instruction access to the main memory will be made, and it will be only data based on data access by the CPU that is transferred through the bus.

Also, if all of data in the loop for which access is made to the main memory are held in cache memory for data (data cache memory), no data access to the main memory will be made, and it will be only instruction codes based on instruction access by the CPU that are transferred through the bus.

In the above situation, examination of the operation of the bus in the state that instruction access and data access to the main memory are steadily made will not be attained.

To solve the above problem, a conventional computer system sets a timer provided therein to allow a timer interrupt against the CPU to occur every fixed time. If the CPU detects a timer interrupt, entries in the instruction cache memory or the data cache memory are disabled with a program, to cause access to the main memory via the bus for an instruction code or data stored therein.

However, the method of disabling the cache using a timer interrupt with a program has the following problem. Since the access speed is different among the types of main memory such as static random access memory (SRAM), synchronous dynamic random access memory (SDRAM) and flash read-only memory (flash ROM), the period of the timer interrupt must be set optimally for each type of main memory.

As another problem, the increase rate of the cache hit rate is not constant depending on the operation of a program. Therefore, with the periodical disabling of the cache memory using timer interrupts, the cache hit rate may increase and thus the state of having no access to the main memory may possibly continue long.

An object of the present invention is providing a cache circuit capable of avoiding decrease in access to main memory due to increase in cache hit rate to ensure execution of examination of the operation of a bus in the state that instruction access and data access to the main memory are steadily made.

SUMMARY OF THE INVENTION

The cache circuit of the present invention includes: cache memory for holding at least either data read/written by an information processor from/into main memory connected to a bus or an instruction code read from the main memory; a cache control circuit for reading data or an instruction code from the cache memory and outputting the read data or instruction code to the information processor in response to a read request for the data or the instruction code from the information processor if a cache hit is determined, reading data or an instruction code from the main memory and allowing the read data or instruction code to be held in the cache memory as well as outputting the read data or instruction code to the information processor if a cache miss is determined, and writing data in the cache memory in response to a write request for the data from the information processor; and a cache memory disabling circuit for disabling data or an instruction code held in the cache memory according to the number of cache hits.

According to the invention described above, since data or an instruction code in the cache memory is disabled according to the number of cache hits, decrease in access to the main memory due to increase in the cache hit rate of the cache memory is avoided irrespective of the type of the main memory and the operation of the program. In this way, examination of the operation of a bus in the state that instruction access and data access to the main memory are steadily made is ensured.

In one embodiment of the invention, the cache memory disabling circuit disables data or an instruction code in the cache memory if the number of cache hits exceeds a predetermined number.

In another embodiment of the invention, the cache circuit further includes a hit count circuit for counting the number of cache hits, wherein the cache memory disabling circuit disables data or an instruction code in the cache memory if the count of the hit count circuit exceeds a predetermined number.

According to the invention described above, data or an instruction code in the cache memory can be disabled if the number of cache hits exceeds a predetermined number.

In yet another embodiment of the invention, at least two each of the cache memory, the cache control circuit and the cache memory disabling circuit are provided for data and for instruction codes, and the cache memory disabling circuit for data disables data in the cache memory for data if the number of cache hits of the cache memory for data exceeds a predetermined number and the number of cache hits of the cache memory for instruction codes exceeds a predetermined number.

In yet another embodiment of the invention, at least two each of the cache memory, the cache control circuit and the cache memory disabling circuit are provided for data and for instruction codes, and the cache memory disabling circuit for instruction codes disables an instruction code in the cache memory for instruction codes if the number of cache hits of the cache memory for instruction codes exceeds a predetermined number and the number of cache hits of the cache memory for data exceeds a predetermined number.

According to the invention described above, data in the cache memory for data or an instruction code in the cache memory for instruction codes can be disabled when the number of cache hits of the cache memory for data exceeds a predetermined number and the number of cache hits of the cache memory for instruction codes exceeds a predetermined number.

In yet another embodiment of the invention, the cache memory disabling circuit disables data or an instruction code held in the cache memory if a cache hit rate as the ratio of the number of cache hits to the number of times of issuance of a write/read request exceeds a predetermined value.

In yet another embodiment of the invention, the cache circuit further includes: an access count circuit for counting the number of times of issuance of the write/read request by the information processor; a hit count circuit for counting the number of cache hits in response to the read/write request; and a hit rate computation circuit for computing the ratio of the number of cache hits counted by the hit count circuit to the number of times counted by the access count circuit.

In yet another embodiment of the invention, once the number of times counted by the access count circuit exceeds a predetermined number, the hit rate computation circuit computes the cache hit rate and resets the access count circuit and the hit count circuit.

According to the invention described above, data or an instruction code in the cache memory can be disabled if the cache hit rate exceeds a predetermined value.

In yet another embodiment of the invention, at least two each of the cache memory, the cache control circuit and the cache memory disabling circuit are provided for data and for instruction codes, and the cache memory disabling circuit for data disables data in the cache memory for data if the cache hit rate of the cache memory for data exceeds a predetermined value and the cache hit rate of the cache memory for instruction codes exceeds a predetermined value.

In yet another embodiment of the invention, at least two each of the cache memory, the cache control circuit and the cache memory disabling circuit are provided for data and for instruction code, and the cache memory disabling circuit for instruction codes disables an instruction code in the cache memory for instruction codes if the cache hit rate of the cache memory for instruction codes exceeds a predetermined value and the cache hit rate of the cache memory for data exceeds a predetermined value.

According to the invention described above, data in the cache memory for data or an instruction code in the cache memory for instruction codes can be disabled if the cache hit rate of the cache memory for data exceeds a predetermined value and the cache hit rate of the cache memory for instruction codes exceeds a predetermined value.

In yet another embodiment of the invention, the cache memory holds at least data, and in disabling of data or an instruction code held in the cache memory, the cache memory disabling circuit writes back the data held in the cache memory into the main memory if the data held in the cache memory does not agree with data stored in the main memory.

According to the invention described above, in disabling of data in the cache memory, disagreement between the data in the cache memory and data stored in the main memory, if any, can be resolved.

In yet another embodiment of the invention, the cache memory disabling circuit disables data or an instruction code held in the cache memory depending on the number of cache hits if the data or the instruction code held in the cache memory corresponds to data or an instruction code in a predetermined address range of the main memory.

According to the invention described above, disabling is performed if data held in the cache memory corresponds to data in a predetermined address range of the main memory. Therefore, it is possible to arrange so that while a cache hit is always obtained for a stack region accessed at the time of function calling and the time of return to a function caller, access to the main memory is made for a data-holding region other than the stack region, to thereby ensure examination of the operation of a bus.

BRIEF DESCRIPTION OF THE DRAWINGS

FIG. 5 is a timing chart showing the operation at the startup of a new program.

DESCRIPTION OF THE PREFERRED EMBODIMENTS

Hereinafter, preferred embodiments of the present invention will be described with reference to the accompanying drawings.

Embodiment 1

In this embodiment, described will be a cache circuit adapted to lower the cache hit rate of cache memory for instruction codes (instruction cache memory) for holding instruction codes for a CPU, on the occasion of examination and evaluation of the operation of a bus, for example.

Figure 1:
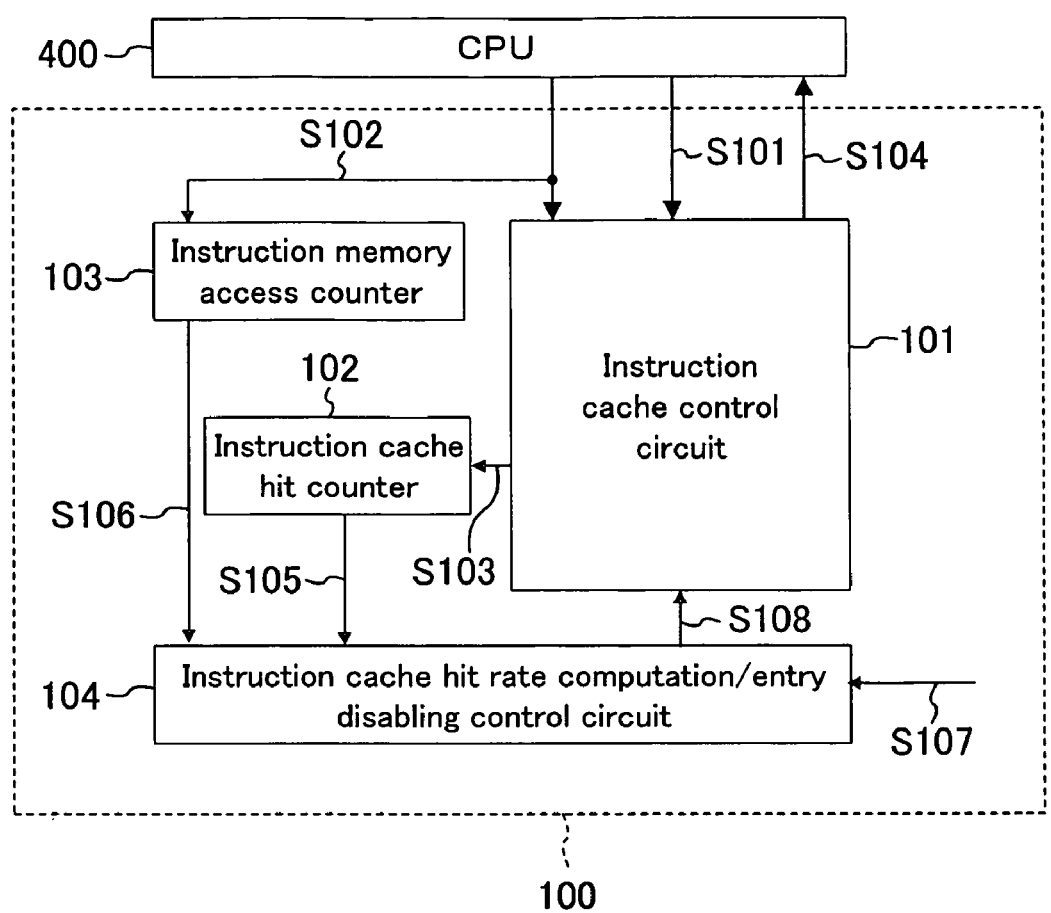
FIG. 1 is a block diagram of a cache circuit of Embodiment 1 of the present invention.

FIG. 1 is a block diagram of a cache circuit 100 of Embodiment 1 of the present invention. Referring to FIG. 1, the cache circuit 100 includes an instruction cache control circuit 101, an instruction cache hit counter 102, an instruction memory access counter 103 and an instruction cache hit rate computation/entry disabling control circuit (instruction disabling control circuit) 104.

When receiving an instruction access signal S102 (signal indicating that a CPU 400 is accessing an instruction code), the instruction cache control circuit 101 determines whether or not the instruction code accessed by the CPU 400 exists in instruction cache memory not shown (that is, whether a cache hit or a cache miss) based on an address signal S101 (signal indicating an address in main memory accessed by the CPU 400) output from the CPU 400.

If a cache hit is determined, the instruction cache control circuit 101 outputs a cache hit signal S103 indicating a cache hit to the instruction cache hit counter 102, and also outputs the instruction code read from the instruction cache memory (signal S104 in FIG. 1) to the CPU 400. If a cache miss is determined, the instruction cache control circuit 101 outputs the instruction code read by accessing the main memory via a bus not shown to the CPU 400, and also writes the read instruction code into the instruction cache memory.

The instruction cache control circuit 101 also disables entries in the instruction cache memory when receiving an instruction cache entry disabling signal S108 (described later) from the instruction disabling control circuit 104.

The instruction cache hit counter 102 counts the number of times of input of the cache hit signal S103 from the instruction cache control circuit 101, and outputs the count result (hit count S105) to the instruction disabling control circuit 104.

The instruction memory access counter 103 counts the number of times of input of the instruction access signal S102 from the CPU 400, and outputs the count result (instruction access count S106) to the instruction disabling control circuit 104.

The instruction disabling control circuit 104 computes the ratio of the hit count S105 to the instruction access count S106 (instruction cache hit rate) when the instruction access count S106 reaches a predetermined number, holds the computed result therein, and then resets the instruction cache hit counter 102 and the instruction memory access counter 103. The instruction disabling control circuit 104 also outputs the instruction cache entry disabling signal S108 to the instruction cache control circuit 101 when the instruction cache hit rate exceeds an instruction cache entry disabling threshold S107 input from outside the cache circuit 100.

The CPU 400 reads an instruction code from either the instruction cache memory or the main memory, and executes the instruction.

In the cache circuit 100 having the configuration described above, in normal operation, the instruction cache entry disabling threshold S107 is set in advance at a value corresponding to the instruction cache hit rate of 100%. With this setting, the instruction cache entry disabling signal S108 is not output, and thus no entry disabling is performed for the instruction cache memory.

At the time of examination and evaluation of the operation of the bus, a value different from that in the normal operation described above is input as the instruction cache entry disabling threshold S107 in advance into the instruction disabling control circuit 104, and then the CPU 400 is instructed to execute a program for examination.

The program for examination is started, and the instruction disabling control circuit 104 computes the instruction cache hit rate every time the instruction access count S106 reaches a predetermined number. Once the computed instruction cache hit rate exceeds the instruction cache entry disabling threshold S107, the instruction disabling control circuit 104 outputs the instruction cache entry disabling signal S108 to the instruction cache control circuit 101, to disable instruction codes held in the instruction cache memory.

When the CPU 400 attempts to read an instruction code after the instruction codes held in the instruction cache memory have been disabled, the instruction cache control circuit 101 accesses the main memory via the bus not shown to read the instruction code and outputs the read instruction code to the CPU 400.

As described above, in the cache circuit of this embodiment, if the cache hit rate of the instruction cache memory exceeds the instruction cache entry disabling threshold, instruction codes held in the instruction cache memory are disabled. This makes it possible to avoid decrease in access to the main memory and perform examination of the operation of the bus in the state that the cache hit rate in instruction access is low.

Embodiment 2

In this embodiment, described will be a cache circuit adapted to lower the cache hit rate of cache memory for data (data cache memory) for holding data accessed by a CPU. Note that in this and subsequent embodiments, any component having the same function as that in Embodiment 1 is denoted by the same reference numeral and the description thereof is omitted.

Figure 2:
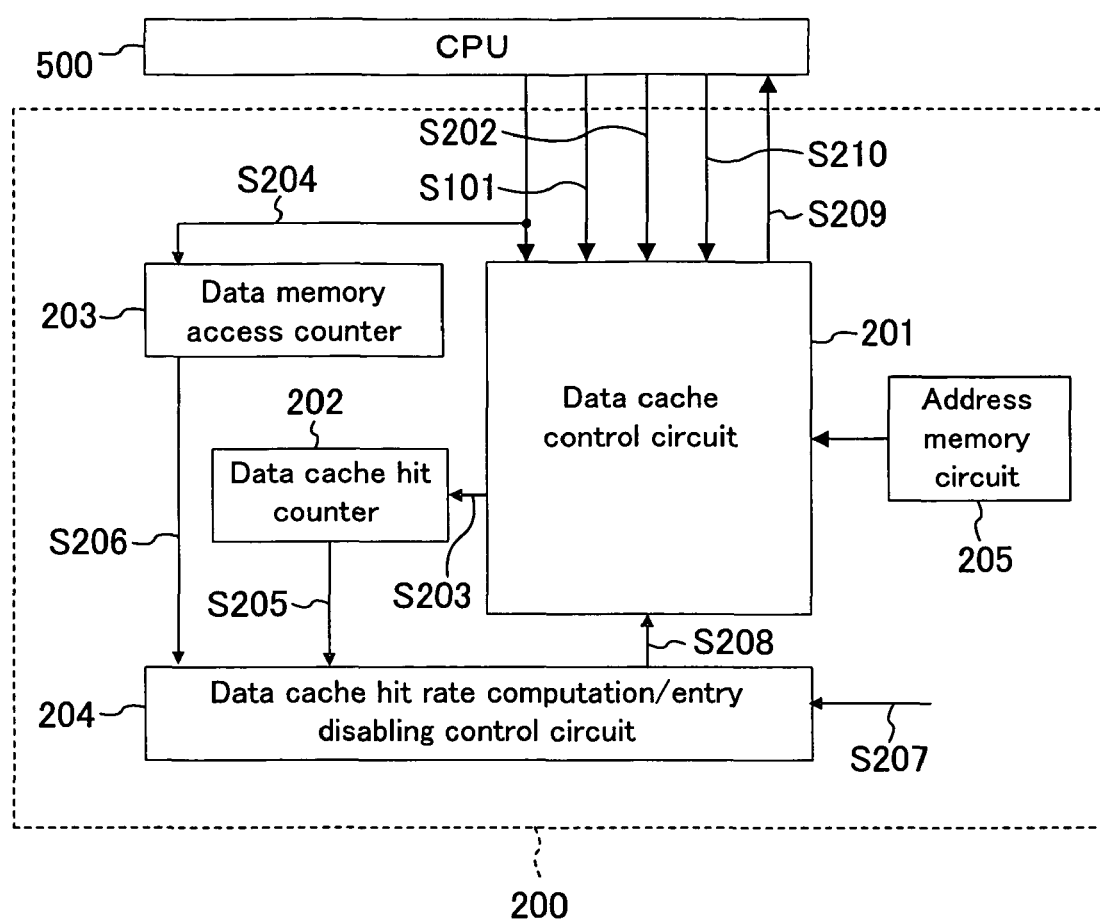
FIG. 2 is a block diagram of a cache circuit of Embodiment 2 of the present invention.

FIG. 2 is a block diagram of a cache circuit 200 of Embodiment 2 of the present invention. Referring to FIG. 2, the cache circuit 200 includes a data cache control circuit 201, a data cache hit counter 202, a data memory access counter 203, a data cache hit rate computation/entry disabling control circuit (data disabling control circuit) 204, and an address memory circuit 205.

When receiving a data access signal S204 (signal indicating that a CPU 500 is accessing data), the data cache control circuit 201 determines whether or not the data being read by the CPU 500 exists in data cache memory (that is, whether a cache hit or a cache miss) based on an address signal S101 (signal indicating an address in main memory accessed by the CPU 500) output from the CPU 500.

If a cache hit is determined, the data cache control circuit 201 outputs a cache hit signal S203 to the data cache hit counter 202. The data cache control circuit 201 also outputs the data read from the data cache memory (signal S209 in FIG. 2) to the CPU 500 when a read/write signal S202 indicates read. When the read/write signal S202 indicates write, the data cache control circuit 201 writes data S210 output from the CPU 500 into the data cache memory. If a cache miss is determined, the data cache control circuit 201 outputs the data read from the main memory (signal S209) via a bus to the CPU 500 and also writes the read data into the data cache memory when the read/write signal S202 indicates read. When the read/write signal S202 indicates write, the data cache control circuit 201 writes the data S210 into the data cache memory.

Also, the data cache control circuit 201 disables entries in the data cache memory when a data cache entry disabling signal S208 (described later) is issued by the data disabling control circuit 204 and the data held in the data cache memory corresponds to data in a predetermined address range (disabling-permitted region) of the main memory. At this time, if the data held in the data cache memory does not agree with the counterpart data stored in the main memory, the data held in the data cache memory is written back into the main memory, and then the entry disabling is performed. Such disagreement may occur when the CPU 500 writes data.

In the cache circuit of this embodiment, addresses in the main memory belonging to the disabling-permitted region are held in advance in the address memory circuit 205, to which the data cache control circuit 201 makes access.

The data cache hit counter 202 counts the number of times of input of the cache hit signal S203 and outputs the count result (hit count S205) to the data disabling control circuit 204.

The data memory access counter 203 counts the number of times of input of the data access signal S204 from the CPU 500, and outputs the count result (data access count S206) to the data disabling control circuit 204.

The data disabling control circuit 204, receiving a data cache entry disabling threshold S207, computes the ratio of the hit count S205 to the data access count S206 (data cache hit rate) when the data access count S206 reaches a predetermined number, stores the computed result therein, and then resets the data cache hit counter 202 and the data memory access counter 203. The instruction disabling control circuit 204 also outputs the data cache entry disabling signal S208 to the data cache control circuit 201 when the data cache hit rate exceeds the data cache entry disabling threshold S207.

The CPU 500 outputs the address signal S101, the read/write signal S202 and the data access signal S204 to the cache circuit 200 at the time of data input/output.

In the cache circuit 200 having the configuration described above, in normal operation, the data cache entry disabling threshold S207 is set in advance at a value corresponding to the data cache hit rate of 100%. With this setting, the data cache entry disabling signal S208 is not output, and thus no entry disabling is made for the data cache memory.

At the time of examination and evaluation of the operation of the bus, a value different from that in the normal operation described above is input as the data cache entry disabling threshold S207 in advance into the data disabling control circuit 204. Also, addresses belonging to a region in which data to be used in a program for examination is stored, for example, are held in the address memory circuit 205 as the disabling-permitted region, and then the CPU 500 is instructed to execute the program for examination.

The program for examination is started, and the data disabling control circuit 204 computes the data cache hit rate every time the data access count S206 reaches a predetermined number. Once the computed data cache hit rate exceeds the data cache entry disabling threshold S207, the data disabling control circuit 204 outputs the data cache entry disabling signal S208 to the data cache control circuit 201.

Receiving the data cache entry disabling signal S208, the data cache control circuit 201 performs the following processing if data held in the data cache memory corresponds to data stored at addresses in the disabling-permitted region.

If the data held in the data cache memory does not agree with the counterpart data in the main memory, the data held in the data cache memory is written back into the main memory, and then entries in the data cache memory are disabled. If the data agrees, only the entry disabling for the data cache memory is performed.

When the CPU 500 attempts to read data after the data held in the data cache memory has been disabled, the data cache control circuit 201 accesses the main memory via the bus not shown and outputs read data to the CPU 500.

As described above, in the cache circuit of this embodiment, if the cache hit rate of the data cache memory exceeds the data cache entry disabling threshold, data held in the data cache memory is disabled. This makes it possible to avoid decrease in access to the main memory and perform examination of the operation of the bus in the state that the cache hit rate in data access is low.

Moreover, entries to be disabled when the cache hit rate becomes high can be limited to a predetermined address region in the main memory designated by the user. It is therefore possible to arrange so that while a cache hit is always obtained for data in a stack region accessed at the time of function calling and the time of return to a function caller, access to the main memory is made only for the region in which data actually used in a program for examination is stored. In this manner, examination of the operation of the bus observed when access is made as intended by the program producer can be performed.

Embodiment 3

Figure 3:
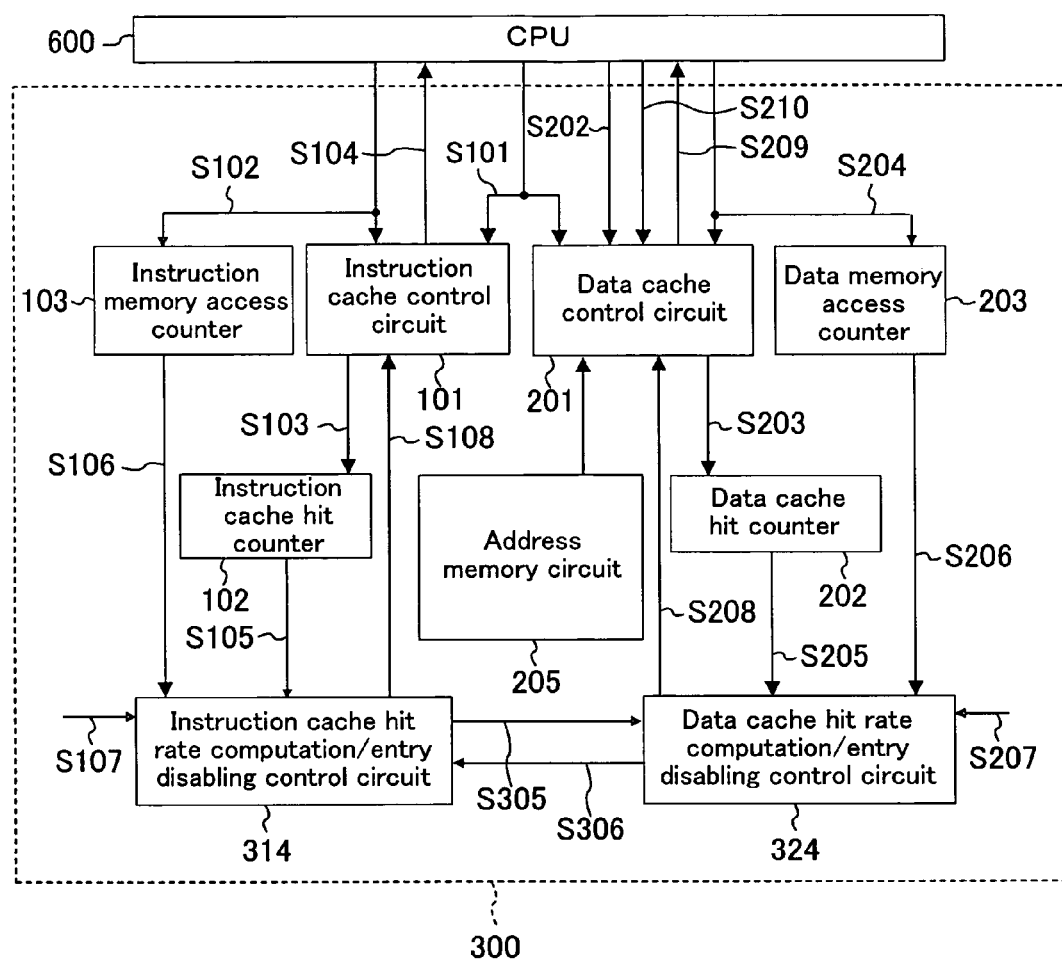
FIG. 3 is a block diagram of a cache circuit of Embodiment 3 of the present invention.

FIG. 3 is a block diagram of a cache circuit 300 of Embodiment 3 of the present invention. Referring to FIG. 3, the cache circuit 300 includes the instruction cache control circuit 101, the instruction cache hit counter 102, the instruction memory access counter 103, the data cache control circuit 201, the data cache hit counter 202, the data memory access counter 203, the address memory circuit 205, an instruction cache hit rate computation/entry disabling control circuit (instruction disabling control circuit) 314 and a data cache hit rate computation/entry disabling control circuit (data disabling control circuit) 324.

The instruction disabling control circuit 314 is different from the instruction disabling control circuit 104 of the cache circuit 100 in the condition under which the instruction cache entry disabling signal S108 is output to the instruction cache control circuit 101.

Specifically, the instruction disabling control circuit 314 outputs the instruction cache entry disabling signal S108 to the instruction cache control circuit 101 when the instruction cache hit rate exceeds the instruction cache entry disabling threshold S107 and also the data cache hit rate computed by the data disabling control circuit 324 (received from the data disabling control circuit 324 as a signal S306 shown in FIG. 3) exceeds a predetermined threshold (called a second data cache entry disabling threshold to distinguish it from the data cache entry disabling threshold S207 input into the data disabling control circuit 324). The second data cache entry disabling threshold may be a predetermined fixed value or may be input externally.

The data disabling control circuit 324 is different from the data disabling control circuit 204 of the cache circuit 200 in the condition under which the data cache entry disabling signal S208 is output to the data cache control circuit 201.

Specifically, the data disabling control circuit 324 outputs the data cache entry disabling signal S208 to the data cache control circuit 201 when the data cache hit rate exceeds the data cache entry disabling threshold S207 and also the instruction cache hit rate computed by the instruction disabling control circuit 314 (received from the instruction disabling control circuit 314 as a signal S305 shown in FIG. 3) exceeds a predetermined threshold (called a second instruction cache entry disabling threshold to distinguish it from the instruction cache entry disabling threshold S107 input into the instruction disabling control circuit 314). The second instruction cache entry disabling threshold may be a predetermined fixed value or may be input externally.

The CPU 600 reads instruction codes and reads/writes data via the cache circuit 300 in execution of a program.

In the cache circuit 300 having the configuration described above, in normal operation, the instruction and data cache entry disabling thresholds S107 and S207 are set in advance at values corresponding to the respective cache hit rates of 100%. With this setting, no entry disabling is made for the instruction cache memory and the data cache memory.

At the time of examination and evaluation of the operation of the bus, values are input as the instruction and data cache entry disabling thresholds S107 and S207 in advance into the instruction and data disabling control circuits 314 and 324, respectively. Also, information indicating the address region in which data to be used in a program for examination is stored, for example, is held in the address memory circuit 205 as the disabling-permitted region. The CPU 600 is then instructed to execute the program for examination.

The program for examination is started, and the instruction cache hit rate is computed every time the instruction access count S106 reaches a predetermined number, and the data cache hit rate is computed every time the data access count S206 reaches a predetermined number.

If the computed instruction cache hit rate exceeds the instruction cache entry disabling threshold S107 and also the input data cache hit rate S306 exceeds the second data cache entry disabling threshold, the instruction disabling control circuit 314 outputs the instruction cache entry disabling signal S108 to the instruction cache control circuit 101, to allow the instruction cache control circuit 101 to disable instruction codes held in the instruction cache memory.

Likewise, if the computed data cache hit rate exceeds the data cache entry disabling threshold S207 and also the input instruction cache hit rate S305 exceeds the second instruction cache entry disabling threshold, the data disabling control circuit 324 outputs the data cache entry disabling signal S208 to the data cache control circuit 201. The data cache control circuit 201 disables entries in the data cache memory if the data held in the data cache memory corresponds to data stored at addresses in the disabling-permitted region. If the data held in the data cache memory does not agree with the counterpart data in the main memory, the data held in the data cache memory is written back into the main memory, and then the entry disabling is performed for the data cache memory. If the data agrees, only the entry disabling for the data cache memory is performed.

Once the disabling is performed for the instruction cache memory and the data cache memory, the CPU 600 reads an instruction code and data from the main memory via a bus.

As described above, in the cache circuit of this embodiment, data access to the main memory can be made while the cache hit rate of the instruction cache memory is high, for example, and thus examination of the operation of the bus in the state that data access to the main memory is made sequentially is ensured. Likewise, instruction access to the main memory can be made while the cache hit rate of the data cache memory is high, for example, and thus examination of the operation of the bus in the state that instruction access to the main memory is made sequentially is ensured.

In the embodiments described above, disabling was made based on the cache hit rate. Alternatively, disabling may be made if the cache hit count exceeds a predetermined value.

Alteration to Embodiment 3

Figure 4:
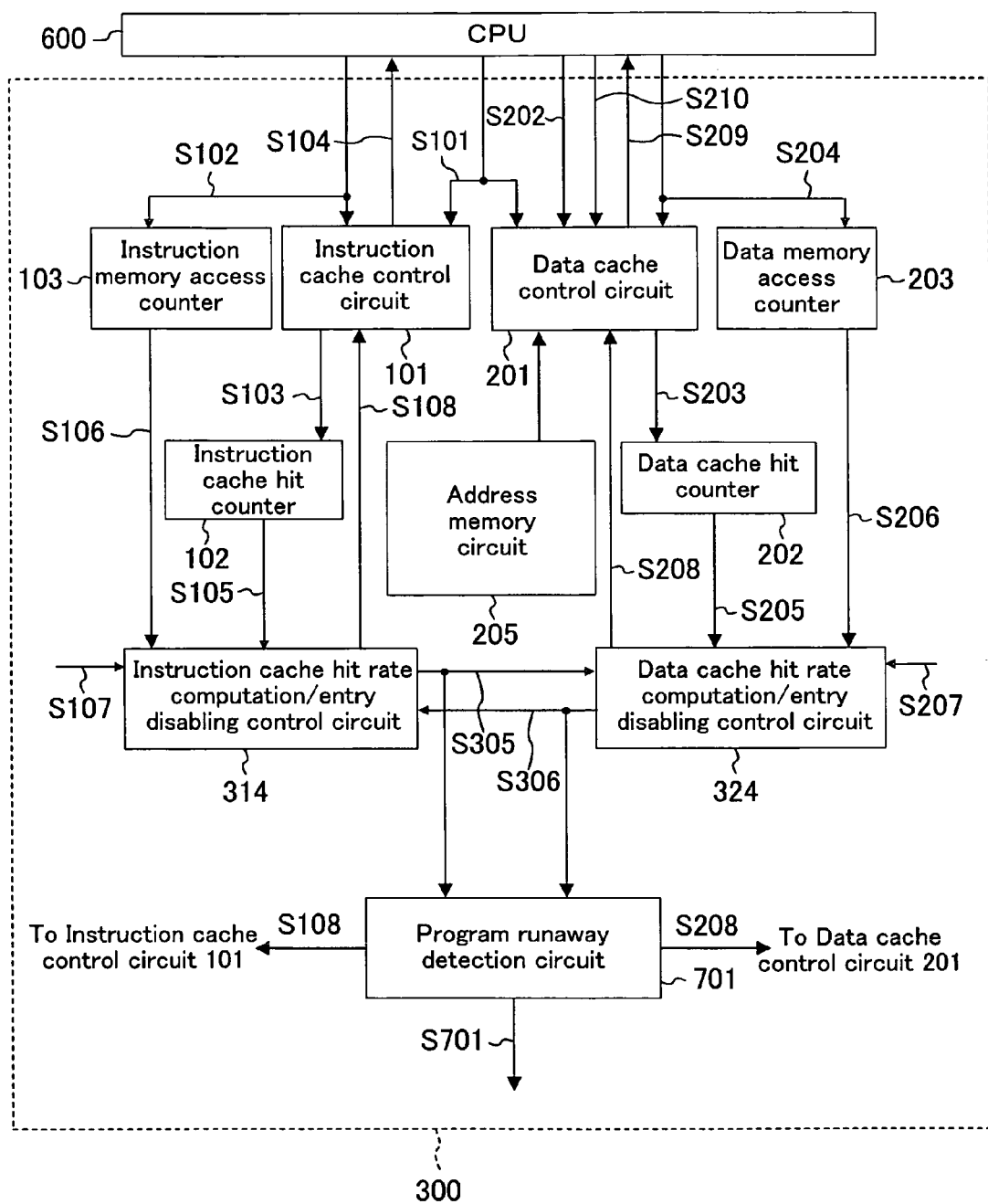
FIG. 4 is a block diagram of a cache circuit of an alteration to Embodiment 3 of the present invention.

FIG. 4 is a block diagram of a cache circuit of an alteration to Embodiment 3 of the present invention. Referring to FIG. 4, the cache circuit of this alteration includes a program runaway detection circuit 701 in addition to the components of the cache circuit 300 described above.

The program runaway detection circuit 701 determines whether or not a currently-executed program is in an infinite loop that is not intended by the user based on the instruction cache hit rate (input as the signal S305 as shown in FIG. 4) and the data cache hit rate (input as the signal S306 as shown in FIG. 4).

To state specifically, if the cache hit rate (instruction cache hit rate or data cache hit rate) remains high for such a long time that is not normally assumed, the program runaway detection circuit 701 outputs the instruction cache entry disabling signal S108 and the data cache entry disabling signal S208 to the instruction cache control circuit 101 and the data cache control circuit 201, respectively, to thereby lower the cache hit rate temporarily. If the cache hit rate soon resumes the high state after the temporary low state and continues to be high for a long time, the program runaway detection circuit 701 determines that the program is in an infinite loop that is not intended by the user, and outputs a signal S701.

The signal S701 output by the program runaway detection circuit 701 may be used to cause an interrupt against the CPU 600, for example. In this way, any user-unintentional program runaway can be detected and the system can resume the normal state.

In the embodiments and the alteration described above, disabling was made based on the cache hit rate. Alternatively, disabling may be made when the cache hit count exceeds a predetermined threshold.

As described above, the cache circuits of the embodiments and the alteration described above can easily control the cache hit rate (instruction cache hit rate or data cache hit rate) irrespective of the type of the main memory and the operation of the program.

Accordingly, in a system using the cache circuit of the present invention, in which decrease in access to the main memory can be avoided, examination of the operation of a bus in the state that instruction access and data access to the main memory are steadily made, for example, is attained.

Also, the cache circuit of the present invention can contribute to optimization of the scales of a power supply circuit and the like in a system using the cache circuit.

In a system using a cache circuit, when the cache hit rate of the cache memory is low, access to the main memory via a bus increases and thus power consumption generally increases. In view of this, the power supply circuit used for this system must be designed considering the power consumption expected when the cache hit rate is low.

However, in a system using the conventional cache circuit, since lowering of the cache hit rate under control is not easy, the correct power consumption expected when the cache hit rate is low is not known, failing to estimate the maximum power consumption of the system correctly. Therefore, in design of the conventional system, a large margin must be provided for the power available from the power supply, and thus the scales of the power supply and the like may possibly become larger than is necessary, requiring extra cost.

On the contrary, in a system using the cache circuit of the present invention, since the system can be easily operated with a low cache hit rate, the power consumption of the system can be estimated correctly in advance. Therefore, in design of the system using the inventive cache circuit, it is unnecessary to provide a margin larger than is necessary for the power supply and the like.

Also, the cache circuit of the present invention can contribute to high-speed switching of a program to be executed.

Suppose the object to be executed is switched from a certain program (first program) to another program (second program) requiring high-speed response. In a system using the conventional cache circuit, entries for the first program now unnecessary in the data cache memory (dirty entries) are written back (write-back operation) after termination of the first program (after time t1 shown in the timing chart of FIG. 5). Thereafter (after time t2 shown FIG. 5), refilling of the data cache memory for the second program and execution of the second program are started.

In a system using the cache circuit of the present invention, entries in the data cache memory can be disabled in advance by lowering the cache hit rate under control while termination processing of the first program is underway, for example. In this manner, the write-back operation of dirty entries for the first program can be completed by the time of termination of the first program. Thus, at the timing of termination of the first program (time t1 in FIG. 5), refilling of the data cache memory for the second program and execution of the second program can be started. In other words, the system using the inventive cache circuit permits higher-speed switching to a program to be executed by disabling entries in the data cache memory in advance.

As described above, the cache circuit of the present invention, which can control the cache hit rate (instruction cache hit rate or data cache hit rate) irrespective of the type of the main memory and the operation of the program, is useful as a cache circuit for controlling cache memory, for example.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A cache circuit comprising:
    a cache memory configured to hold at least either data read/written by an information processor from/into main memory connected to a bus or an instruction code read from the main memory;
    a cache control circuit configured to read data or an instruction code from the cache memory and output the read data or instruction code to the information processor in response to a read request for the data or the instruction code from the information processor if a cache hit is determined, read data or an instruction code from the main memory and allow the read data or instruction code to be held in the cache memory as well as output the read data or instruction code to the information processor if a cache miss is determined, and write data in the cache memory in response to a write request for the data from the information processor; and
    a cache entry invalidating circuit configured to invalidate an entry of data or an instruction code held in the cache memory according to a number of cache hits,
    wherein the cache entry invalidating circuit invalidates data or an instruction code in the cache memory when the number of cache hits is greater than a predetermined number.

2. The cache circuit of claim 1, further comprising a hit count circuit configured to count the number of cache hits,
    wherein the cache entry invalidating circuit invalidates data or an instruction code in the cache memory if a count of the hit count circuit exceeds a predetermined number.

3. The cache circuit of claim 1, wherein a first set of the cache memory, the cache control circuit and the cache entry invalidating circuit is provided for data and a second set of the cache memory, the cache control circuit and the cache entry invalidating circuit is provided for an instruction code, and
    the cache entry invalidating circuit for data invalidates data in the cache memory for data if the number of cache hits of the cache memory for data exceeds a predetermined number and the number of cache hits of the cache memory for instruction codes exceeds a predetermined number.

4. The cache circuit of claim 1, wherein a first set of the cache memory, the cache control circuit and the cache entry invalidating circuit is provided for data and a second set of the cache memory, the cache control circuit and the cache entry invalidating circuit is provided for an instruction code, and
    the cache entry invalidating circuit for instruction codes invalidates an instruction code in the cache memory for instruction codes if the number of cache hits of the cache memory for instruction codes exceeds a predetermined number and the number of cache hits of the cache memory for data exceeds a predetermined number.

5. The cache circuit of claim 1, wherein the cache entry invalidating circuit invalidates data or an instruction code held in the cache memory if a cache hit rate as a ratio of the number of cache hits to a number of times of issuance of a write/read request exceeds a predetermined value.

6. The cache circuit of claim 5, further comprising:
    an access count circuit configured to count the number of times of issuance of the write/read request by the information processor;
    a hit count circuit configured to count the number of cache hits in response to the read/write request; and
    a hit rate computation circuit configured to compute the ratio of the number of cache hits counted by the hit count circuit to the number of times counted by the access count circuit.

7. The cache circuit of claim 6, wherein, once the number of times counted by the access count circuit exceeds a predetermined number, the hit rate computation circuit computes the cache hit rate and resets the access count circuit and the hit count circuit.

8. The cache circuit of claim 5, wherein a first set of the cache memory, the cache control circuit and the cache entry invalidating circuit is provided for data and a second set of the cache memory, the cache control circuit and the cache entry invalidating circuit is provided for an instruction code, and
    the cache entry invalidating circuit for data invalidates data in the cache memory for data if the cache hit rate of the cache memory for data exceeds predetermined value and the cache hit rate of the cache memory for instruction codes exceeds a predetermined value.

9. The cache circuit of claim 5, wherein a first set of the cache memory, the cache control circuit and the cache entry invalidating circuit is provided for data and a second set of the cache memory, the cache control circuit and the cache entry invalidating circuit is provided for an instruction code, and
    the cache entry invalidating circuit for instruction codes invalidates an instruction code in the cache memory for instruction codes if the cache hit rate of the cache memory for instruction codes exceeds a predetermined value and the cache hit rate of the cache memory for data exceeds a predetermined value.

10. The cache circuit of claim 1, wherein the cache memory holds at least data, and
    in invalidating data or an instruction code held in the cache memory, the cache entry invalidating circuit writes back the data held in the cache memory into the main memory if the data held in the cache memory does not agree with data stored in the main memory.

11. The cache circuit of claim 1, wherein the cache entry invalidating circuit invalidates data or an instruction code held in the cache memory depending on the number of cache hits if the data or the instruction code held in the cache memory corresponds to data or an instruction code in a predetermined address range of the main memory.

* * * * *